(12) United States Patent
Gershman et al.

(10) Patent No.: US 10,397,151 B2
(45) Date of Patent: Aug. 27, 2019

(54) COORDINATION OF DATA RECEIVED FROM ONE OR MORE SOURCES OVER ONE OR MORE CHANNELS INTO A SINGLE CONTEXT

(71) Applicant: III HOLDINGS 2, LLC, Wilmington, DE (US)

(72) Inventors: Greg Gershman, Baltimore, MD (US); Michael J. Miller, Germantown, MD (US); George Dardamanis, Cockeysville, MD (US)

(73) Assignee: III HOLDINGS 2, LLC, Wilmington, DE (US)

( * ) Notice: Subject to any disclaimer, the term of this patent is extended or adjusted under 35 U.S.C. 154(b) by 0 days.

(21) Appl. No.: 15/814,815

(22) Filed: Nov. 16, 2017

(65) Prior Publication Data

US 2018/0077094 A1    Mar. 15, 2018

Related U.S. Application Data

(63) Continuation of application No. 14/740,428, filed on Jun. 16, 2015, which is a continuation of application No. 12/007,949, filed on Jan. 17, 2008, now Pat. No. 9,081,844, which is a continuation of application No. 10/265,740, filed on Oct. 8, 2002, now Pat. No. 7,426,535.

(51) Int. Cl.
| | | |
|---|---|---|
| *H04L 12/58* | (2006.01) | |
| *H04L 29/08* | (2006.01) | |
| *G06F 16/27* | (2019.01) | |
| *H04L 29/06* | (2006.01) | |
| *H04W 4/14* | (2009.01) | |

(52) U.S. Cl.
CPC .......... *H04L 51/066* (2013.01); *G06F 16/278* (2019.01); *H04L 51/32* (2013.01); *H04L 67/14* (2013.01); *H04L 67/20* (2013.01); *H04L 67/42* (2013.01); *H04W 4/14* (2013.01)

(58) Field of Classification Search
CPC ......... H04L 67/14; H04L 67/20; H04L 67/42; H04L 51/066; H04L 51/32; H04W 4/14; G06F 17/30584
USPC .......................... 709/203, 217, 219, 223, 224
See application file for complete search history.

(56) References Cited

U.S. PATENT DOCUMENTS

| | | |
|---|---|---|
| 5,721,817 A | 2/1998 | Kurihara et al. |
| 5,860,073 A | 1/1999 | Ferrel et al. |

(Continued)

FOREIGN PATENT DOCUMENTS

| | | |
|---|---|---|
| CA | 2335445 A1 | 8/2002 |
| WO | 9750002 A1 | 12/1997 |
| WO | 02065331 A2 | 8/2002 |

*Primary Examiner* — Michael C Lai
(74) *Attorney, Agent, or Firm* — Brundidge & Stanger, P.C.

(57) ABSTRACT

A middleware messaging system is connected between user devices and content providers possibly through one or more networks. The middleware messaging system includes a coordination manager for coordinating partial messages transmitted between the user devices and the content providers. Partial messages received by the middleware messaging system from one or more sources through one or more channels. Partial messages that are associated with each other comprise a single context and as such are coordinated and transmitted to one or more destinations through one or more channels.

23 Claims, 2 Drawing Sheets

(56) References Cited

U.S. PATENT DOCUMENTS

| | | | |
|---|---|---|---|
| 5,899,975 | A | 5/1999 | Nielsen et al. |
| 5,905,773 | A * | 5/1999 | Wong .................. H04M 1/271 379/88.03 |
| 5,960,337 | A * | 9/1999 | Brewster ................ A61K 31/02 342/386 |
| 5,970,391 | A * | 10/1999 | Eaton .................. H04W 88/023 455/503 |
| 6,041,357 | A | 3/2000 | Kunzelman et al. |
| 6,085,247 | A | 7/2000 | Parsons et al. |
| 6,169,515 | B1 * | 1/2001 | Mannings ............... G01C 21/34 342/357.31 |
| 6,182,116 | B1 | 1/2001 | Namma et al. |
| 6,199,107 | B1 | 3/2001 | Dujari et al. |
| 6,223,289 | B1 | 4/2001 | Wall et al. |
| 6,230,173 | B1 | 5/2001 | Ferrel et al. |
| 6,269,336 | B1 * | 7/2001 | Ladd .................. H04M 3/42204 379/88.13 |
| 6,338,082 | B1 * | 1/2002 | Schneider ......... H04L 29/12594 709/203 |
| 6,366,934 | B1 | 4/2002 | Cheng et al. |
| 6,397,246 | B1 | 5/2002 | Wolfe et al. |
| 6,397,259 | B1 | 5/2002 | Lincke et al. |
| 6,430,624 | B1 | 8/2002 | Jamtgaard et al. |
| 6,519,643 | B1 | 2/2003 | Foulkes et al. |
| 6,578,056 | B1 * | 6/2003 | Lamburt ........... G06F 17/30557 707/999.007 |
| 6,601,101 | B1 | 7/2003 | Lee et al. |
| 6,601,108 | B1 | 7/2003 | Marmor et al. |
| 6,654,796 | B1 * | 11/2003 | Slater .................. H04L 41/0273 709/201 |
| 6,788,949 | B1 | 9/2004 | Bansal et al. |
| 6,804,372 | B1 | 10/2004 | Kondo et al. |
| 6,826,613 | B1 | 11/2004 | Wang et al. |
| 6,871,213 | B1 | 3/2005 | Graham et al. |
| 6,877,036 | B1 * | 4/2005 | Smith ...................... H04L 69/16 709/202 |
| 6,877,095 | B1 | 4/2005 | Allen et al. |
| 6,894,984 | B2 * | 5/2005 | Wastlhuber .......... G05B 19/042 370/252 |
| 6,925,307 | B1 | 8/2005 | Mamdani et al. |
| 6,937,869 | B1 * | 8/2005 | Rayburn ................ G01C 21/20 340/990 |
| 6,950,058 | B1 * | 9/2005 | Davis ...................... G01S 19/05 342/357.42 |
| 6,954,751 | B2 | 10/2005 | Chrisffort et al. |
| 6,973,505 | B1 * | 12/2005 | Schneider ......... G06F 17/30887 707/E17.115 |
| 6,983,370 | B2 | 1/2006 | Eaton et al. |
| 6,988,126 | B2 | 1/2006 | Wilcock et al. |
| 7,043,255 | B1 * | 5/2006 | Tiwari .................... H04W 8/18 455/456.1 |
| 7,072,987 | B2 | 7/2006 | Jurisch et al. |
| 7,099,946 | B2 | 8/2006 | Lennon et al. |
| 7,191,245 | B2 * | 3/2007 | Takayama ............. G08C 15/00 707/999.104 |
| 7,324,556 | B2 * | 1/2008 | Hoff ..................... H04W 76/19 370/469 |
| 7,426,535 | B2 * | 9/2008 | Gershman ......... G06F 17/30584 709/203 |
| 7,487,248 | B2 | 2/2009 | Moran et al. |
| 7,818,664 | B2 | 10/2010 | Gordon et al. |
| 7,925,432 | B2 * | 4/2011 | Odinak ............... G01C 21/3629 701/420 |
| 2001/0005809 | A1 * | 6/2001 | Ito ....................... G01C 21/3415 701/411 |
| 2001/0036835 | A1 | 11/2001 | Leedom et al. |
| 2001/0056354 | A1 | 12/2001 | Feit et al. |
| 2002/0002599 | A1 * | 1/2002 | Arner ........................ G06F 9/54 709/219 |
| 2002/0002602 | A1 * | 1/2002 | Vange ................... G06F 9/5027 709/219 |
| 2002/0010716 | A1 | 1/2002 | McCartney et al. |
| 2002/0029089 | A1 | 3/2002 | Ueda et al. |
| 2002/0049790 | A1 | 4/2002 | Ricker et al. |
| 2002/0059425 | A1 | 5/2002 | Belfiore et al. |
| 2002/0065064 | A1 | 5/2002 | Griffith et al. |
| 2002/0095582 | A1 * | 7/2002 | Peled ...................... G06F 21/10 713/180 |
| 2002/0110097 | A1 * | 8/2002 | Sugirtharaj ........... H04W 28/20 370/329 |
| 2002/0143971 | A1 | 10/2002 | Govindarajan et al. |
| 2002/0169539 | A1 * | 11/2002 | Menard .................. G01C 21/26 701/532 |
| 2002/0178342 | A1 | 11/2002 | Noguchi et al. |
| 2003/0158897 | A1 | 8/2003 | Ben-Natan et al. |
| 2005/0272443 | A1 * | 12/2005 | Hose ....................... G08G 1/207 455/456.1 |
| 2007/0201622 | A1 | 8/2007 | Croak et al. |
| 2007/0266176 | A1 | 11/2007 | Wu et al. |
| 2008/0178072 | A1 | 7/2008 | Fiedorowicz et al. |
| 2010/0268773 | A1 | 10/2010 | Hunt et al. |

* cited by examiner

COORDINATION OF DATA RECEIVED FROM ONE OR MORE SOURCES OVER ONE OR MORE CHANNELS INTO A SINGLE CONTEXT

CROSS REFERENCE

This Application is a Continuation of U.S. Ser. No. 14/740,428, filed Jun. 16, 2015, which is a Continuation of U.S. Ser. No. 12/007,949, now U.S. Pat. No. 9,081,844, filed on Jan. 17, 2008, which is a continuation of U.S. Ser. No. 10/265,740, filed on Oct. 8, 2002, now U.S. Pat. No. 7,426,535, the entireties of which are expressly incorporated by reference.

FIELD OF THE INVENTION

The invention is generally related to computer networks. More particularly, the invention is related to data coordination.

BACKGROUND OF THE INVENTION

In today's information age, a user may use one or more devices to retrieve desired information. For example, a user may use a cellular phone, personal digital assistant, lap top, etc., to retrieve information from a content provider over one or more networks. These devices may include multimodal applications that receive/transmit information through one or more channels (i.e., paths on which signals may flow). For example, an application may transmit voice on one channel, text on another channel, images on another channel, etc.

Different requests may also travel on different channels. On the other hand, an application may transmit both voice and data on the same channel.

Regardless of the number of channels, these multimodal applications exemplify the requirement of coordinated input from one or more devices. For example, a user may input part of a single request through a first modality, and the rest through a second modality.

Without a system to recognize that these request fragments contribute to a single request (i.e., the input is not coordinated), it is not possible to correctly service the request. Therefore, regardless of whether fragments of a request, fragments of a response, fragments from a "front-end," or fragments from a "back-end" are received, coordination of the fragments into a single context allows for the proper servicing of the data composed from the fragments.

SUMMARY OF THE INVENTION

An embodiment of the invention includes a method for coordinating data from one or more sources. The method comprises steps of receiving data; determining whether the received data is partial data, wherein partial data includes data to be coordinated with other received data (i.e., partial data is a fragment of the complete data); and coordinating the received data with associated data in response to the received data being partial data. The associated data may be received before or after the received partial data.

Another embodiment of the invention includes a method of coordinating data received from one or more sources through one or more channels. The data includes data being transmitted to one or more destinations. The method comprises steps of receiving the data; determining whether the received data is partial data, wherein partial data includes data to be coordinated with other received data (i.e., partial data is a fragment of the complete data); and coordinating the received data with associated data in response to the received data being partial data. The associated data may be received before or after the received partial data.

Yet another embodiment of the invention includes a system comprising a plurality of user devices connected to a plurality of content providers through one or more networks. Messages transmitted between the plurality of user devices and the plurality of contents providers are received by a coordination manager. The coordination manager coordinates the messages that are associated with each other such that the coordinated messages are combined into a single message (i.e., context).

The methods of the present invention include steps that may be performed by computer-executable instructions executing on a computer-readable medium.

Those skilled in the art will appreciate these and other aspects of various embodiments of the invention upon reading the following detailed description of a preferred embodiment with reference to the below-listed drawings.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
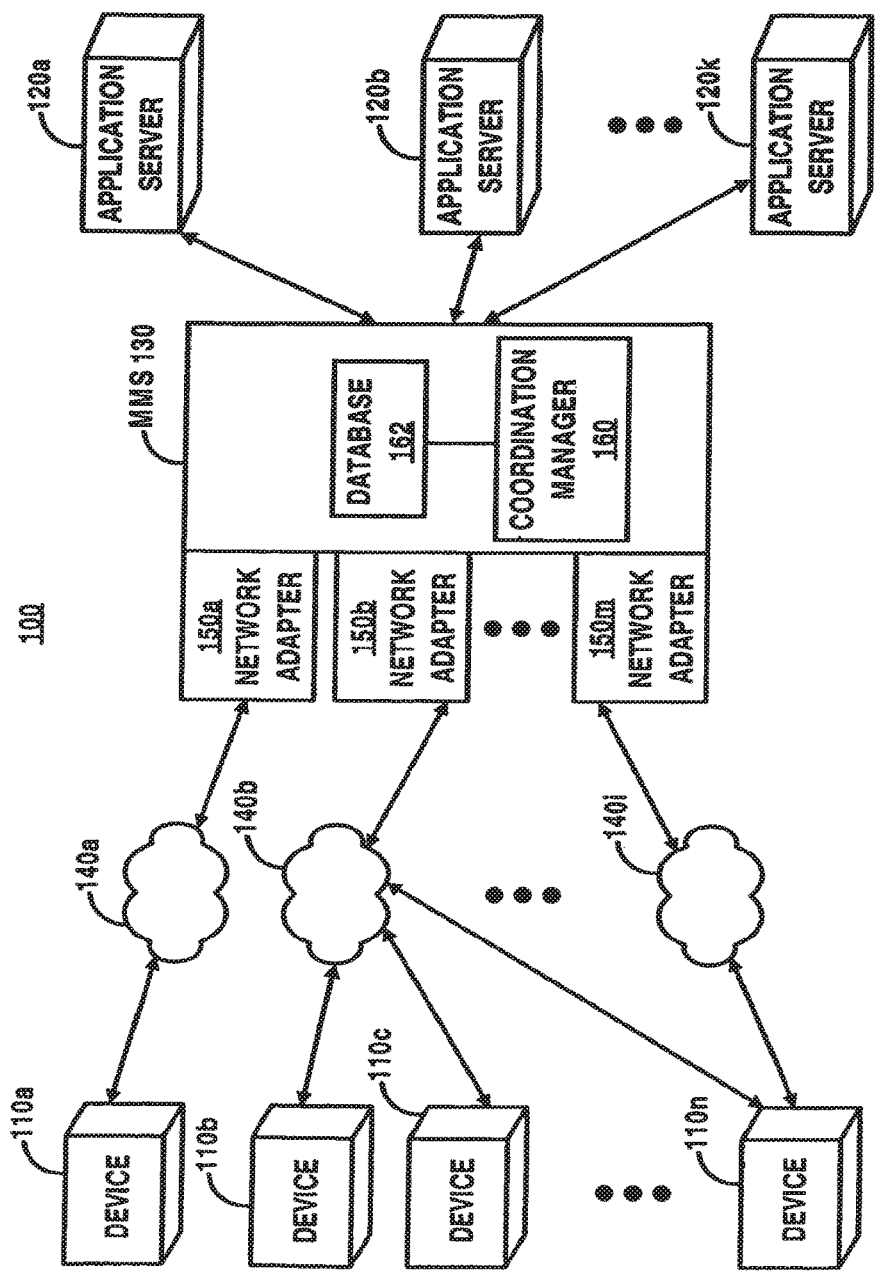
FIG. 1 illustrates a block-diagram of an exemplary system according to an embodiment of the invention.

FIG. 1 illustrates an exemplary system 100 according to an embodiment of the invention. A plurality of user devices 110a . . . n are connected to application servers 120a . . . k through a middleware messaging system (MMS) 130. The user devices 110a . . . n may include any conventional computing device, such as a laptop, personal computer (PC), work station, PDA, cellular phone, wired phone, pocket PC, e-mail retrieval device, etc. The user devices 110a . . . n may transmit requests for data via one or more networks, such as networks 140a . . . i, to the MMS 130. The networks 140a . . . i may include wired or wireless networks using one or more protocols to transmit data. Network adaptors 150a . . . m connected to the MMS 130 include ports for receiving/transmitting data. The network adaptors 150a . . . m may support different protocols to accommodate the different networks 140a . . . i. The application servers 120a . . . k may be directly connected to the MMS. 130 or connected through one or more networks, which may include the networks 140a . . . i. The application servers 120a . . . k provide content to the user devices 110a . . . n. For example, data may be transmitted to the user device 110a from the application servers 120a and 120b via the MMS 130 in response to a user request for data. The MMS 130 may include conventional means for receiving data from the application servers 120a . . . k.

The MMS 130 includes a coordination manager 160 for coordinating data from one or more sources. The coordination manager 160 coordinates data that may be received from one or more devices on one or more channels. For example, data received from one or more user devices (e.g., user devices 110a and/or 110b) may be coordinated; data received from one or more servers (e.g., application servers 120a and/or 120b) may be coordinated; and data received from a user device and a server may be coordinated (e.g., user device 110 and application sever 120a). The data may be received on one or more channels.

The data to be coordinated is data comprising parts of a single context. Data may be coordinated for a request or a response. For example, the data to be coordinated can be all the data that is needed to make a request, or the data to be coordinated can be all the data needed to respond to a request.

The coordination manager 160 may be connected to a database 162 for storing data to be coordinated. When data to be coordinated (i.e., partial data) is received by the coordination manager 160, the partial data may be stored in the database 162. Also, partial data may be retrieved from the database 162 and then coordinated with newly received other data.

The coordination manager 160 may include one or more servers. A computer program for coordinating messages may be stored and executed on the one or more servers. The coordination manager 160 is not limited to servers and may include other computing devices having one or more processors.

An example of coordinating data is as follows. A user desires to locate a restaurant by asking for directions from a current location via a wireless device (e.g., a cellular phone, which may be user device 110a). In doing so, data about his current location must eventually become part of the request. Thus, if the user is speaking through his phone to the system 100 and says "I'd like directions to a restaurant within 10 miles of my current location", the user is only providing a partial request, which is transmitted to the coordination manager 160 through a channel. In addition, data supplied by the user's GPS device, for instance, provides the remainder of the necessary data (i.e., the device's, and hence, the user's location), which is transmitted to the coordination manager 160 through another channel. In another example, the user may point to a restaurant destination on a touch-sensitive monitor in his car. The destination information may then be transmitted to the coordination manager 160 through yet another channel.

The coordination manager 160 may receive the first request from the cellular phone (e.g., 110a). Before transmitting the request to an application server (e.g., application server 120a) that can provide the requested data, the coordination manager 160 waits until all the data for the request (e.g., the GPS information or the destination information provided separately via the car monitor) is received and compiled. Partial request data may be stored by the coordination manager 160 in the database 162 until all request data is received. After all request data is received and compiled, the coordination manager 160 transmits the request to the application server 120a.

The data that is coordinated by the coordination manager 160 need not be provided from a user device. Some or all the data may be provided from other sources. For example, the user may have user preferences, such as preferring a particular type of food, stored on a server (e.g., application server 120b) connected to the MMS 130. The application server 120b may transmit the user's restaurant-related preferences to the coordination manager 160. The coordination manager 160 waits until this information is received, as well as the user's location, etc., such that all the request data may be transmitted to the application server 120a using, for example, a single message.

Data parts may be compiled, that is combined into a single coordinated data message and then transmitted to one or more destinations. The data may be transmitted over a network using a protocol established beforehand between the two systems.

The coordination manager 160 can coordinate data being transmitted to a user's device on one or more channels. For example, in response to a user's request to order a list of books, a number of application servers may need to be contacted to establish the availability of each book. The coordination manager 160 coordinates all the responses from all the application servers into a single response to present to the user over any number of channels.

It will be apparent to one of ordinary skill in the art that these examples are provided by way of illustration and not of limitation. In addition, the coordination manager 160 may coordinate data received from one or more sources on one or more channels. Furthermore, the coordinated data may be transmitted to one or more destinations on one or more channels. The coordinated data may include requests for data or responses to requests for data or other messages.

The coordination manager 160 may coordinate data based upon a variety of techniques that are largely implementation dependent. In one embodiment, message header information may identify that data contained in the message's body is only part of a request and is to be coordinated. For example, the data received from the user's cellular phone may include a header that indicates that the contained data is the position information that is to be coordinated with the user's request for directions (from the user's current location). In another embodiment, an extensible markup language (XML) document containing a partial request, perhaps corresponding to an XML document type definition (DTD) or Schema, may include information that identifies the data (e.g., source and requested information expected from the source) to be coordinated.

Other coordination techniques known to one of ordinary skill in the art may be implemented without departing from the spirit and scope of the invention. Furthermore, using header information, information in the XML document or other techniques, the coordination manager 160 may determine whether received data needs to be coordinated or whether specific data comprises a complete request that does not need to be coordinated.

Figure 2:
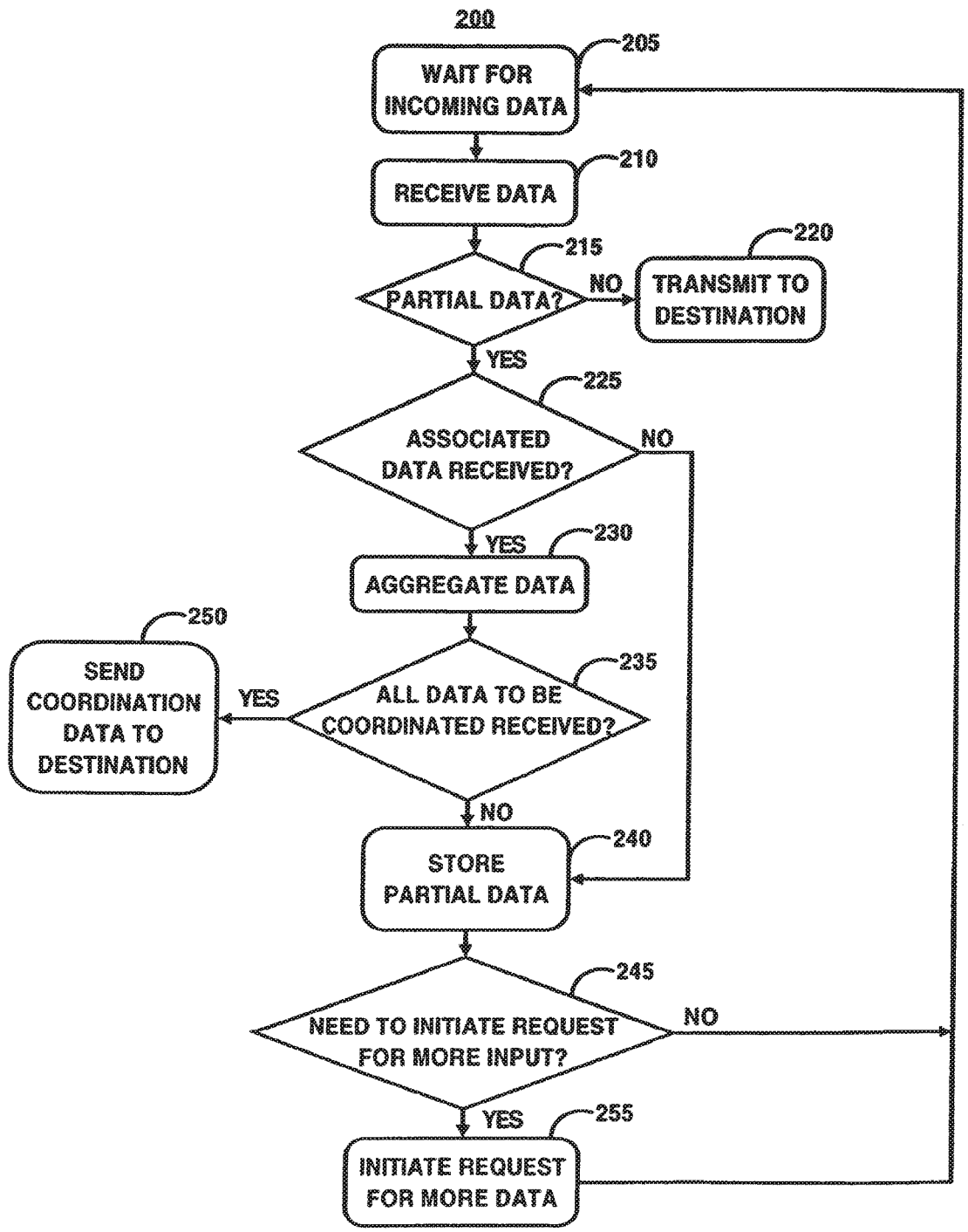
FIG. 2 illustrates a flow chart of an exemplary method according to an embodiment of the invention.

FIG. 2 illustrates an exemplary method 200 according to an embodiment of the invention. In step 205, the coordination manager 160 waits for incoming data. In step 210, the coordination manager 160 receives data.

In step 215, the coordination manager 160 determines whether the received data is partial data (i.e., data to be coordinated with other data). This determination may be performed, for example, using XML document requests, DTDs and/or header information. Partial data may eventually be coordinated with other associated partial data.

In step 220, if the received data is not partial data, the data is transmitted to a destination, such as a user device (e.g., user device 110a), an application server (e.g., application server 120a), etc. In step 225, if the received data is partial data, the coordination manager 160 determines whether associated data (i.e., any other partial data to be coordinated with the data received in step 210) has been received by the coordination manager 160. For example, the coordination manager 160 stores partial data in the database 162. The coordination manager 160 determines whether associated partial data is stored in the database 162.

In step 230, if associated data has been received, the coordination manager 160 aggregates the partial data received in step 210 with the associated data, for example, after the associated data has been retrieved from the database 162. This process continues iteratively as described below.

In step 240, if associate data has not been received (as determined in step 225), the partial data is stored in the database 162 and associated data subsequently received is eventually aggregated with the stored partial data. The aggregated data may also be stored in the database 162.

After the partial data is aggregated in step 230, the coordination manager determines whether all the partial data to be coordinated has been received (step 235). This determination may be performed, for example, using XML document requests, DTDs and/or header information.

If all the data to be coordinated has been received, the coordination manager 160 sends the coordinated data to its destination(s) (step 250). If all the data to be coordinated has not been received, the coordination manager 160 stores the partial data received in step 210 in the database (step 240). Then, the coordination manager 160 determines whether a request for more partial data should be initiated (step 245). For example, a certain data state may be associated with a need to request more data from specific source(s). If the coordination manager 160 detects the data state, it requests data from one or more sources.

If the coordination manager 160 determines that a request should be initiated, the request is initiated (step 255). The coordination manager 160 generates the request and transmits the request to a content provider or other destination that can provide the requested information. Then, the coordination manager 160 waits for incoming data. If a request need not be initiated, as determined in step 245, the coordination manager 160 waits for further incoming data.

The method 200 can be performed by a computer program. That is, the steps performed by the coordination manager 160 can be performed by a computer program. The computer program can exist in a variety of forms both active and inactive. For example, the computer program and objects can exist as software comprised of program instructions or statements in source code, object code, executable code or other formats; or firmware program(s). Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While this invention has been described in conjunction with the specific embodiments thereof, it is evident that many alternatives, modifications and variations will be apparent to those skilled in the art. There are changes that may be made without departing from the spirit and scope of the invention.

We claim:

1. A method at a user device comprising:
   receiving, by the user device, an audio request for information via a multimodal application of the user device, the audio request comprising partial data, the partial data being a fragment of complete data for a computing device to provide complete information corresponding to the audio request;
   transmitting, by the user device, the partial data to a remote computer system, the remote computer system comprising a coordination management computer system;
   receiving, by the user device from the remote computer system, a request for associated data that is associated with the partial data, wherein the associated data is to be complied with the partial data to provide the complete information corresponding to the audio request;
   responsive to the received request for the associated data, transmitting, by the user device, the associated data to the remote computer system;
   receiving, by the user device, the complete information corresponding to the audio request, the complete information comprising the associated data combined with the partial data; and
   presenting, by the user device, the complete information corresponding to the audio request via at least one interface component of the user device.

2. The method of claim 1, wherein the remote computer system comprises a plurality of servers.

3. The method of claim 1, further comprising:
   receiving, by the user device, a request for missing data, from the remote computer system, wherein the request for missing data is sent from the remote computer system after the remote computer system establishing that not all data, needed to be compiled to provide the complete information corresponding to the audio request, has been received.

4. The method of claim 3, further comprising:
   sending, by the user device, the missing data to the remote computer system.

5. The method of claim 1, wherein the receiving the complete information corresponding to the audio request includes receiving the complete information corresponding to the audio request after missing data and the associated data are combined with the partial data.

6. The method of claim 5, wherein the missing data is obtained from one or more sources.

7. The method of claim 1, wherein the associated data is in the form of text.

8. The method of claim 1, wherein the user device is a mobile phone.

9. The method of claim 1, wherein the associated data includes location information of the user device.

10. The method of claim 9, wherein the location information of the user device is derived from a Global Positioning System (GPS) device.

11. The method of claim 1, wherein the complete information corresponding to the audio request comprises a response to the audio request for information.

12. The method of claim 1, wherein the presenting comprises presenting the complete information corresponding to the audio request in a visual format via the at least one interface component of the user device.

13. The method of claim 1, wherein the presenting comprises presenting the complete information corresponding to the audio request in an audible format via the at least one interface component of the user device.

14. The method of claim 1, wherein the presenting comprises presenting the complete information corresponding to the audio request in a visual and audible format via the at least one interface component of the user device.

15. A user device, comprising:
a memory;
one or more processors connected to the memory, wherein the one or more processors are configured to:
receive an audio request for information via a multimodal application, the audio request comprising partial data, the partial data being a fragment of complete data for a computing device to provide complete information corresponding to the audio request,
transmit the partial data to a remote computer system, the remote computer system comprising a coordination management computer system,
receive from the remote computer system a request for associated data that is associated with the partial data, wherein the associated data is to be complied with the partial data to provide the complete information corresponding to the audio request,
responsive to the received request for the associated data, transmit the associated data to the remote computer system, and
receive the complete information corresponding to the audio request, the complete information comprising the associated data combined with the partial data; and
at least one interface component configured to present the complete information corresponding to the audio request in a visual and/or audible format.

16. The user device of claim 15, wherein the one or more processors are further configured to receive a request for missing data, from the remote computer system, wherein the request for missing data is sent from the remote computer system after the remote computer system establishing that not all data, needed to be complied to provide the complete information corresponding to the audio request, has been received.

17. The user device of claim 16, wherein the one or more processors are further configured to transmit the missing data to the remote computer system.

18. The user device of claim 15, wherein the associated data is in the form of text.

19. The user device of claim 15, wherein the user device is a mobile phone.

20. The user device of claim 15, wherein the associated data includes location information of the user device.

21. The user device of claim 20, wherein the location information of the user device is derived from a Global Positioning System (GPS) device.

22. The user device of claim 15, the complete information corresponding to the audio request comprises a response to the audio request for information.

23. A non-transitory computer-readable medium that stores instructions that, in response to execution, cause a user device to perform or control performance of operations comprising:
receive, by the user device, an audio request for information via a multimodal application of the user device, the audio request comprising partial data, the partial data being a fragment of complete data for a computing device to provide complete information corresponding the audio request;
transmit, by the user device, the partial data to a remote computer system, the remote computer system comprising a coordination management computer system;
receive, by the user device, from the remote computer system, a request for associated data that is associated with the partial data, wherein the associated data is to be compiled with the partial data to provide the complete information corresponding to the audio request;
responsive to the received request for the associated data, transmit, by the user device, the associated data to the remote computer system;
receive, by the user device, the complete information corresponding to the audio request, the complete information comprising the associated data combined with the partial data; and
present, by the user device, the complete information corresponding to the audio request in a visual and/or audible format via at least one interface component of the user device.

* * * * *